US011265777B2

(12) United States Patent
Mustajarvi et al.

(10) Patent No.: US 11,265,777 B2
(45) Date of Patent: Mar. 1, 2022

(54) WLAN TERMINATION U-PLANE RELOCATION WITHOUT C-PLANE RELOCATION

(71) Applicant: Nokia Technologies Oy, Espoo (FI)

(72) Inventors: Jari Pekka Mustajarvi, Espoo (FI); Janne Petteri Tervonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 951 days.

(21) Appl. No.: 15/779,184

(22) PCT Filed: Jan. 15, 2016

(86) PCT No.: PCT/US2016/013601
§ 371 (c)(1),
(2) Date: May 25, 2018

(87) PCT Pub. No.: WO2017/123244
PCT Pub. Date: Jul. 20, 2017

(65) Prior Publication Data
US 2021/0204179 A1 Jul. 1, 2021

(51) Int. Cl.
*H04W 36/00* (2009.01)
*H04W 72/12* (2009.01)
(Continued)

(52) U.S. Cl.
CPC ... *H04W 36/0072* (2013.01); *H04W 72/1273* (2013.01); *H04W 92/10* (2013.01); *H04W 92/18* (2013.01); *H04W 84/12* (2013.01)

(58) Field of Classification Search
CPC ............. H04W 36/0072; H04W 92/18; H04W 72/1273; H04W 92/10; H04W 84/12
See application file for complete search history.

(56) References Cited

U.S. PATENT DOCUMENTS

2008/0031159 A1* 2/2008 Jokinen ............. H04W 36/0033
370/255
2011/0256872 A1* 10/2011 Xu ........................ H04W 36/08
455/436

(Continued)

FOREIGN PATENT DOCUMENTS

CN          104471981 A      3/2015
WO     WO-2015/127241 A1    8/2015

OTHER PUBLICATIONS

"(Temporary) loss of WLAN coverage in LWA", Samsung, 3GPP TSG-RAN WG2 Meeting #92, R2-156082, Nov. 2015, 10 pages.

(Continued)

*Primary Examiner* — Ivan O Latorre
(74) *Attorney, Agent, or Firm* — Harrington & Smith

(57) ABSTRACT

A control-plane interface is established between a cellular radio access node and an anchor for at least first and second non-cellular radio access nodes (such as API and AP2); and thereafter during mobility of a user equipment (UE) from API to AP2, the anchor relocates a user-plane interface for a radio link allocated to the UE from API to AP2 while maintaining the established control-plane interface for the radio link. When implemented for LTE-WLAN Aggregation (LWA), the control-plane interface is Xw-C with a corresponding control plane wireless termination (WT-C), the user-plane interface is Xw-U with a corresponding user plane wireless terminations (WT-U); the cellular radio access node is an eNB, the APs belong to the anchor and have BSSs that belong to a same mobility set that is configured for the UE by the eNB; the anchor is the WT-C, and the APs are WT-Us.

20 Claims, 4 Drawing Sheets

(51) Int. Cl.
*H04W 92/10* (2009.01)
*H04W 92/18* (2009.01)
*H04W 84/12* (2009.01)

(56) References Cited

U.S. PATENT DOCUMENTS

| | | | | |
|---|---|---|---|---|
| 2013/0090124 | A1* | 4/2013 | Panchal | H04W 24/02 |
| | | | | 455/452.1 |
| 2017/0273125 | A1* | 9/2017 | Teyeb | H04W 76/15 |
| 2017/0325276 | A1* | 11/2017 | Aminaka | H04W 16/14 |
| 2018/0035343 | A1* | 2/2018 | Godin | H04W 36/28 |
| 2018/0132143 | A1* | 5/2018 | Sirotkin | H04W 88/06 |
| 2018/0227815 | A1* | 8/2018 | Sharma | H04W 28/08 |
| 2018/0227976 | A1* | 8/2018 | Dudda | H04W 36/125 |
| 2020/0154329 | A1* | 5/2020 | Aminaka | H04W 36/0044 |

OTHER PUBLICATIONS

3GPP TSG-RAN2 #91 Meeting, Beijing, China, Aug. 24-28, 2015, R2-153726, "Discussion on LWA CP/UP termination", MediaTek Inc., 4 pgs.

3GPP TSG-RAN2 Meeting 91bis, Malmo, Sweden, Oct. 5-9, 2015, R2-154997, "Running 36.300 CR for LTE-WLAN Radio Level Integration and Interworking Enhancement", Intel Corporation, 28 pgs.

"Mobility procedures for LTE-WLAN aggregation", Ericsson, 3GPP TSG RAN WG2 #91, R2-153689, Aug. 2015, 7 pages.

Qualcomm Incorporated; "3.1 Definitions Abbreviations"; R3-152770; 3GPP Draft; TP from RAN3#90 RI for 36300 Draft CR; Nov. 20, 2015; whole document (27 pages).

* cited by examiner

WLAN TERMINATION U-PLANE RELOCATION WITHOUT C-PLANE RELOCATION

TECHNOLOGICAL FIELD

The described invention relates to wireless communications, and more particularly to mobility in heterogeneous radio environments where a mobile device has aggregated radio links using two different radio access technologies such as cellular and non-cellular.

BACKGROUND

Acronyms used herein are listed below following the detailed description. The 3GPP has defined a concept for LTE-WLAN Aggregation (LWA). LWA allows eNB to use WLAN resources for 3GPP service delivery. In the concept, eNB is communicating with a WLAN termination (WT) over Xw interface, to exchange data that is to be sent over WLAN to the UE. Both eNB and WT entities may have multiple counterparts in the Xw interface. A WT can be realized as a dedicated WLAN AP or WLAN Controller (or both combined together), for example. From 3GPP point of view, a WT hosts one or more WLAN radio accesses, namely WLAN APs and BSSs in those APs. When eNB engages an UE to LWA, it may define a Mobility Set (MS) to the UE. A MS is a collection of BSSIDs, indicating those BSSs that are part of the MS. All BSSs in a MS has to belong to single WT. A UE may autonomously move within a MS without changing WT. In fact, the WT does not need to be even aware of such mobility.

Any given UE can have only one mobility set at a time, and additionally any given UE may have a measurement set which covers certain APs outside that UE's mobility set. The measurement set may be accompanied with event configuration which enables the eNB to learn when a BSS which is not part of the mobility set becomes much better than any of the current mobility set BSSs. This could trigger a new LWA configuration, changing one or both the WLAN termination and the mobility set. Whenever a MS is changed, it affects negatively to the QoE (Quality of Experience) and system performance as the event increases eNB signaling load with the UE and with the WT and causes temporary WLAN service disruption.

In modern networks, the control plane and user plane networking elements are often separated. In such environment, it may be difficult to create mobility sets that exceed single WLAN AP. The control plane entity like WLAN controller may terminate the WT control plane (WT-C) signaling for the eNB but WT user plane (WT-U) would have to be terminated in a WLAN AP. The AP schedules WLAN traffic and is able to provide required Xw flow control feedback to the eNB. WLAN controller can be for example in a cloud, outside the WLAN data path.

For reasons detailed herein, the inventors consider that it would be feasible to allow WLAN mobility within multiple APs in a MS while updating only the WT-U termination during the mobility for eNB. WT-C would remain the same and mobility would not require a new Xw-C connection negotiation.

SUMMARY

According to a first aspect of these teachings there is a method comprising: establishing a control-plane interface between a cellular radio access node and an anchor for at least a first non-cellular radio access node and a second non-cellular radio access node; and thereafter during mobility of a user equipment (UE) from the first to the second non-cellular radio access node, the anchor relocating a user-plane interface for a radio link allocated to the UE from the first to the second non-cellular radio access node while maintaining the established control-plane interface for the radio link.

According to a second aspect of these teachings there is an apparatus comprising at least one memory storing a computer readable program; and at least one processor. In this aspect the at least one processor, with the at least one memory and the computer readable program, cause the apparatus to at least: establish a control-plane interface between a cellular radio access node and an anchor for at least a first non-cellular radio access node and a second non-cellular radio access node; and thereafter during mobility of a user equipment (UE) from the first to the second non-cellular radio access node, relocate a user-plane interface for a radio link allocated to the UE from the first to the second non-cellular radio access node while maintaining the established control-plane interface for the radio link.

According to a third aspect of these teachings there is a memory storing a program of computer readable instructions that when executed by at least one processor cause a host communication device to at least: establish a control-plane interface between a cellular radio access node and an anchor for at least a first non-cellular radio access node and a second non-cellular radio access node; and thereafter during mobility of a user equipment (UE) from the first to the second non-cellular radio access node, relocate a user-plane interface for a radio link allocated to the UE from the first to the second non-cellular radio access node while maintaining the established control-plane interface for the radio link.

According to a fourth aspect of these teachings there is an apparatus comprising control means and communication means. In this embodiment these means together are for: establishing a control-plane interface between a cellular radio access node and an anchor for at least a first non-cellular radio access node and a second non-cellular radio access node; and thereafter for, during mobility of a user equipment (UE) from the first to the second non-cellular radio access node, relocating a user-plane interface for a radio link allocated to the UE from the first to the second non-cellular radio access node while maintaining the established control-plane interface for the radio link. In a particular embodiment the control means is implemented at least as a processor in combination with a memory storing computer executable instructions; and the communication means is implemented at least as a modem for communicating with the cellular radio access node.

DETAILED DESCRIPTION

Figure 1:
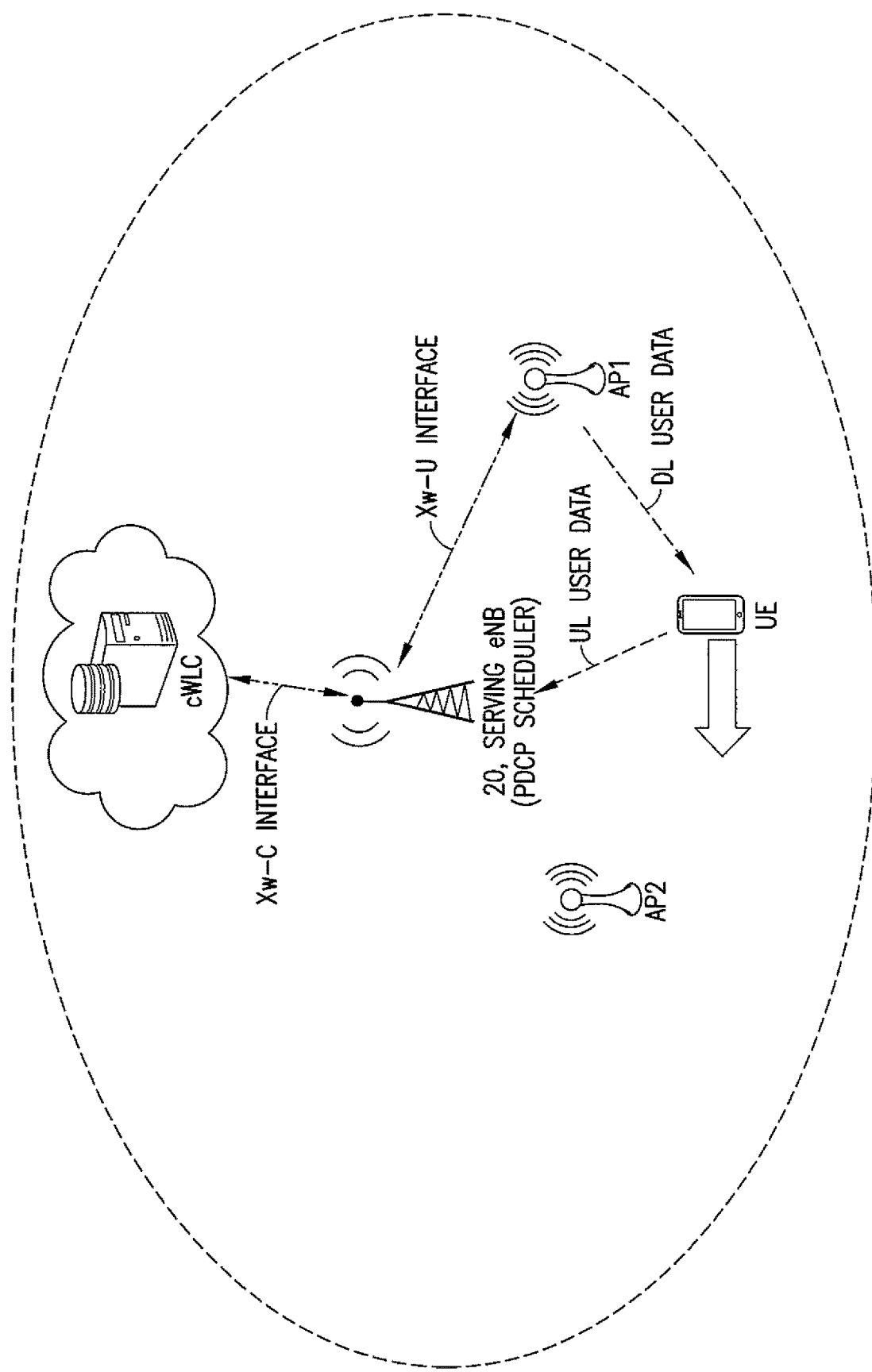
FIG. 1 is a schematic diagram illustrating an example radio environment in which embodiments of these teachings may be practiced and showing a split of the Xw interface into user-plane and control-plane portions according to embodiments of these teachings.

The examples and description herein assumes the relevant radio access technologies are LTE and WLAN, but these are non-limiting examples and these teachings may be deployed for other combinations of cellular and non-cellular RATs. Embodiments of these teaching have the UE's Xw interface user-plane (u-plane, generally user data) and control plane (c-plane, generally control signaling) split so that the UE's WLAN data link can change among the different APs without changing the WT-C termination for the c-plane information. Currently there is only one WLAN data link at a time contemplated per UE, but in embodiments of these teachings there can also be simultaneously multiple WLAN data links for a UE each with different quality of service (QoS) requirements; relocating the WT-U termination in this case would mean relocating all of the UE's multiple allocated WLAN data links from one AP to the other while keeping the WT-C termination unchanged. This enables more flexibility, and as will be detailed below by example there is no need to reconfigure the UE's LWA mobility set whenever the serving AP is changed. This is an advantage over the prior art since in the prior art the u- and c-planes were not disaggregated meaning that autonomous UE mobility would be allowed only when both WT-U and WT-C terminations remain the same. In environments where WT-U is naturally terminated in a WLAN AP directly, this would involve additional signaling with the UE and with the WT, causing additional signaling load to the system but also a temporary WLAN service disruption thereby lowering QoE for the user.

In the LWA concept the interface between the eNB serving the UE and the UE's WT is called an Xw interface. The inventors are aware of no compelling reason to limit the UE's mobility so much that WT-U termination (address) cannot change within a mobility set as this does not require any negotiations with the UE. Especially with the recent development of cloudification, one could very well expect WT-C termination to be in a cloud server (the Nokia® cloud wireless LAN controller cWLC is one such cloud server) and WT-U termination to be in the dedicated APs. Reference below to a cWLC refers to a WLAN controller generally, which is not participating to user plane traffic transfer. However, there is currently no support for WT-U relocation within such a mobility set. This is actually quite a limiting restriction, in some cases it may force the mobility set size to be one AP depending on the WLAN network capabilities. Further, the examples below are in the specific context of LWA but the teachings herein are applicable for any such cellular/non-cellular integration without regard to the specific radio access technology signaling protocols involved.

In the current state of the art relating to LWA and WT, when there is need to change the WT-U termination, the eNB has to prepare a completely new LWA configuration to the WT and terminate the old one. In this case the handover is anything but smooth in that such a handover requires also a new mobility set configuration and likely WLAN service disruption.

When the Xw interface is present between the serving eNB and the AP, the Xw-U interface (u-plane) delivers PDCP payload over the GPRS tunneling protocol (GTP) from the eNB to WT-U. Each LWA UE would have own GTP tunnel endpoints, potentially one for each LWA data radio bearer in LTE. LWA currently does not include UL data transfer over Xw-U interface but DL data delivery reports (DL flow control feedback) from WT-U are sent to eNB over the bearer specific Xw-U UL tunnel. Between the UE and the WT-U, the addressing is based on L2 MAC addresses (physical addresses) and optionally also on the LWA header added before the PDCP payload. The LWA WLAN radio interface does not utilize the internet protocol (IP) layer at all. All that is required is that WLAN can deliver the L2 message to the UE. All of the uplink user data in LWA goes via LTE although WLAN needs to provide flow control feedback to the eNB in uplink direction. It makes little difference if the WT-U gets relocated during WLAN mobility or movement. The only cost in relocating the WT U-plane without relocating the WT C-plane as described herein is a short break in the data transmission due to the UE's movement (handover) and WT-U change. WT-U change itself is negligible compared to handover delays. If we consider to the normal handover delay as including a complete WT change involving tearing down the WLAN radio link and setting it up again, the delays due to only a WT-U change while keeping the WT-C unchanged are much shorter than this.

Embodiments of these teachings enable the eNB PDCP scheduler to quickly recover LWA service after the WLAN mobility and WT-U relocation, if the scheduler itself has detected problems in the WLAN leg. It is of course already known to split the C plane and the U plane in core networks, and there is even discussion in 3GPP of standardizing split c and U interfaces for the serving gateway. But these teachings consider WT-U relocation in the scope of LWA, and related to a mobility set.

The following proceeds from the assumption that the WT-C would be aware when WLAN mobility has been completed and the UE has entered a new WLAN AP. Such mobility involves a new association (or re-association) procedure between UE and the new WLAN AP and includes some security key establishment procedure, typically at minimum a 4-way handshake, but this is peripheral to the main aspects of these teachings. WT-C may either run the association and security procedure itself, or be part of it or get indication from WLAN AP when they have been completed for the UE. As soon as the WT-C learns the UE presence in the new AP, the WT-C knows if this UE is a LWA user. It also knows previously used tunnel endpoint identifier (TEID) values and data radio bearers (DRBs) in the Xw interface for the old AP.

The WT-C may in one embodiment provide new WT-U TEID values for the new AP, or in another embodiment request new TED values for the DRBs from the new AP. These TEID values are known as DL-TEID values. In an embodiment the WT-C may request from the new AP certain internet protocol (IP) transport details such as the IP address for the Xw-U interface, but in other embodiments this may be already known to the WT-C The WT-C provides to the new AP the existing eNB Xw-U termination information, including IP address and UL-TEID values, to be used for any UL traffic and DL data delivery reports for the concerned LWA bearer.

As soon as the new AP has been prepared for the LWA for the new user/UE, the WT-C will run the WT-U relocation signal with the eNB, indicating the new IP termination point and DL-TEID values for the LWA DRBs of the user. Since the new WLAN connection with the UE has been already completed, the eNB can immediately switch the GTP endpoints for the user to the new WT-U termination and continue LWA data scheduling for the WLAN connection over the relocated Xw-U interface.

The UL termination in the eNB remains the same during the mobility within a MS. The WT-C only needs to make the new AP aware of these values. The Xw UL termination in the eNB may be used for Xw flow control reporting to assist the eNB PDCP scheduler to decide which interface, LTE or WLAN, should be selected to deliver further DL payload packets of the LWA bearer.

FIG. 1 is a schematic diagram illustrating an example LWA radio environment in which a UE has a mobility set that includes a BSS in AP1 and AP2. The UE's control plane is with the cloud-based cWLC that has the Xw-C interface for the UE's WLAN radio link as being with the eNB that serves the UE directly with LTE radio access technology. In prior art LWA there is only an Xw interface between the eNB and the WT/cWLC; these teachings are best explained with a disaggregated Xw-C and Xw-U interface as FIG. 1 illustrates. The UE is connected via its WLAN radio/data link to AP1 initially and so gets its downlink (DL) user data from it, but is moving towards AP2. Downlink user data to the UE is scheduled by the eNB's PDCP scheduler and passed over the Xw-U interface between the eNB and AP1 for wireless delivery to the UE on that WLAN data link using WLAN radio access technology. All uplink (UL) user data from the UE goes on the LTE link to the eNB directly. If in future 3GPP releases uplink data is sent also over WLAN then this is also supported by these teachings as we already have setup an uplink Xw tunnel for DL data delivery report messages to assist flow control (selection between LTE and WLAN links) in eNB, as will be shown below.

When the UE changes its WLAN attachment from AP1 to AP2 which it can do autonomously within a MS in LWA, there needs to be established a XW-U interface between AP2 and the eNB, and the PDCP scheduler needs to track any DL user data given to AP1 to ensure it has either been delivered to the UE or if not to schedule it for delivery via AP2. The UL data is on the LTE link and is not interrupted in this mobility scenario. AP1 and AP2 are in the same mobility set and so the WT-U termination is changing in this mobility scenario to new AP but the WT-C termination will remain with the cWLC in the cloud.

Figure 2:
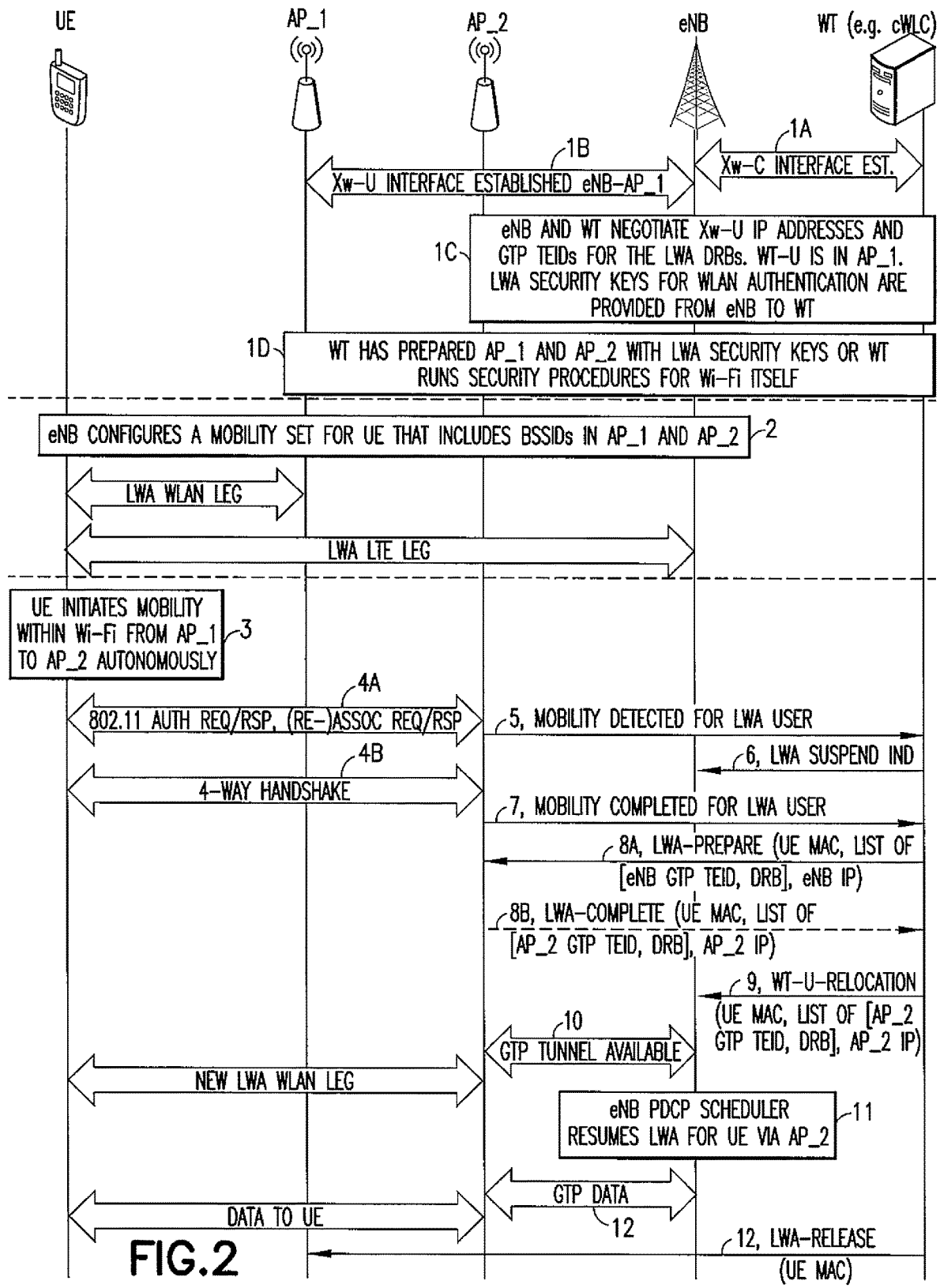
FIG. 2 is a signaling diagram illustrating signaling between the various network entities for relocating the WLAN terminations U-plane (WT-U) without relocating its C-plane (WT-C) in a LWA radio environment such as that of FIG. 1, according to certain embodiments of these teachings.

FIG. 2 is a signaling diagram illustrating details for how this mobility in FIG. 1 can be performed by all the relevant entities. Initially as is shown at the top of FIG. 2 there is a Xw-C interface established between the WT (the cWLC) and the eNB (step 1a), and also the eNB has a Xw-U interface established with AP1 (step 1b) which will initially be serving the UE's DL user data needs.

At step 1c the eNB and the WT (cWLC) negotiate the internet protocol (IP) addresses to use for the Xw-U interfaces it might use for the mobility set, which in this example has only AP1 and AP2 but in other deployments may have more than only two APs. Also at step 1c they negotiate the GTP DL-TEID and UL-TEID values for the LWA bearers/links in DL and UL direction, and the eNB may provide to the WT/cWLC the security keys it will need to setup WLAN security with the UE for LWA connection. The WT/cWLC may provide the LWA security keys to AP1 and AP2, or the WT/cWLC may run the Wi-Fi security procedure itself by acting as an AAA server. Other security mechanisms (like legacy EAP-AKA) are possible too but security as such is not a central aspect of these teachings. Here, initial WT-U termination is negotiated for the AP which triggered LWA establishment in the first place in eNB (based on measurement events) but if the UE registers in another AP then this just results into immediate WT-U relocation.

Now after all LWA preparations between WT (WT-C which is implemented in FIG. 1 as the cWLC) and eNB, and within the WT entities (WT-C/WT-U), at step 2 the eNB configures the UE with a LWA configuration that includes the mobility set having AP1 and AP2. More particularly in this regard the eNB gives to the UE the BSS IDs being used by AP1 and AP2 for the BSS that makes up this mobility set. Once configured the UE will have its LWA WLAN leg established with AP1 and its LWA LTE leg established with the eNB as FIG. 2 shows. These are shown in FIG. 1 as the DL user data and the UL user data links, respectively. LWA DL data may be sent also via LTE bearer but this is not shown here as this example considers only WLAN participation.

After a time communicating under the setup resulting from step 2, the UE moves nearer to AP2 and at a certain point sees its measurement of AP2 is stronger than of AP1 by a prescribed threshold for a minimum period of time. This is an event that triggers mobility of the UE from AP1 to AP2 which step 3 of FIG. 2 shows is an autonomous decision by the UE but could be also commanded by WLAN network. The UE's first action for this mobility is to send an 802.11 authentication request at step 4a to the new AP2 and in response by AP2 the UE associates with AP2 using a re-association request and response. In step 4b, the UE executes an IEEE 802.11 four-way handshake procedure to negotiate transient security keys for the WLAN connection with the AP. This procedure requires that both DE and AP have learned the PMK (Pairwise Master Key—a common root key for transient key derivation) prior this handshake. It is known that the UE and eNB may derive a PMK from the Kasme security key negotiated by the UE and eNB for the master LTE connection. The key is provided to AP in steps 1c/1d. In case EAP authentication is used (which optionally precedes four-way handshake), the PMK is derived from the keying material negotiated between the UE and an authentication server where the authentication server provides the PMK to the AR When implemented it may be that LWA may deploy different short cuts for WLAN security but these teachings are compatible with typical security protocols the inventors consider might be suitable for a LWA deployment.

While that handshake between the UE and the new AP2 is ongoing the WT/cWLC detects at step 5 that the UE is a LWA user and is moving from AP1 to AP2. Since the PDCP scheduler in the eNB is scheduling downlink user data for the UE over its WLAN link the WT/cWLC may notify the eNB to suspend LWA for this UE at step 6. At this point the eNB buffers downlink user data for the UE, to be scheduled and sent later to the new AP2 once the eNB learns enough information to do so. Or depending on cellular/LTE traffic loading the eNB can send some or all of this downlink user data to the UE over the LTE link. Some considerations in this regard are detailed further below.

Once the authentication at steps 4a/4b is complete and the UE is associated to the new AP2, AP2 notifies the WT/cWLC that the UE's mobility is complete at step 7. This notification can be implicit in some embodiments or explicit in others. At step 8a the WT/cWLC prepares the new AP2 for the LWA and provides the UE's MAC address, the bearer list including list of the eNB's GTP UL-TEID values and the eNB IP address for UL transmissions and respective DL-TEID values for DL transmissions. This step may happen also during initial handshake or security procedures in 4a/4b, especially if the WT/cWLC needs to provide the PMK for the AP as part of step 8a. The AP may acknowledge to the WT/cWLC that it is ready to accept LWA data for the UE in step 8*b*. If the AP itself manages the allocation of TEIDs then in such an embodiment instead of the WT providing them to AP in step 8*a*, the AP may provide DL TEID values and the IP address for the WT-U termination to the WT/cWLC in step 8*b*.

At step 9 the WT/cWLC sends to the eNB a WT-U relocation message that includes the UE's MAC address, and a list of the new AP2's GTP tunnel endpoint IDs and IP address for the LWA DRBs. Now the eNB also has all the information it needs for relocating WT-U for the UE and the new GTP tunnel is alive at step 10. Alternatively WT-C may just indicate old WT-U terminations to the eNB and provide new WT-U terminations to eNB in the WT-U relocation message. eNB just needs to know what to relocate.

Now since the UE has a new LWA WLAN leg established with AP2 and Xw-U is reset, the PDCP scheduler in the eNB can resume sending downlink data to the UE over WLAN using LWA at step 11. At step 12 this LWA WLAN data is flowing over the new Xw-U leg to AP2 and finally to the UE, and DL data delivery reports are sent back to eNB via the uplink Xw tunnel of the bearer. AP1 may release autonomously its LWA resources or in another embodiment it may be released only via WT-C instructions which is also shown at step 12.

Respecting downlink packets directed to the UE while the WT-U is being re-located, all mobility consumes some delay in the packet reception in the UE. This may happen independently whether the WT-U is relocated or not. Still, the PDCP scheduler in the eNB can execute flow control algorithms to determine whether a packet should be sent to the UE via a WLAN or a LTE bearer. The PDCP scheduler may notice (for example, due to missing acknowledgements) there is some delay in packet deliveries for the transmitted packets to the old AP1. As a result it may put WLAN into hold for data delivery to this UE and use only LTE for further transmissions. In this case the relocation indication at step 9 from the WT itself may be sufficient for the eNB to resume WLAN usage in the PDCP scheduler.

The solution detailed herein for re-locating a WT-U without involving UE and without changing the WT that has the c-plane enables different types of WLAN deployments for LWA usage. It is especially advantageous that this solution alleviates need for LWA specific data plane concentrator in the WT. Standalone APs offloading directly to the internet but served and configured by a wireless controller (the WT/cWLC) can be used in a common mobility set. This could prove to be very advantageous for certain LWA network equipment manufacturers, and the solution presented herein can be standardized in 3GPP specifications or it can be adopted by individual vendors as an extension to the conventional Xw interface without that extension being standardized.

Figure 3:
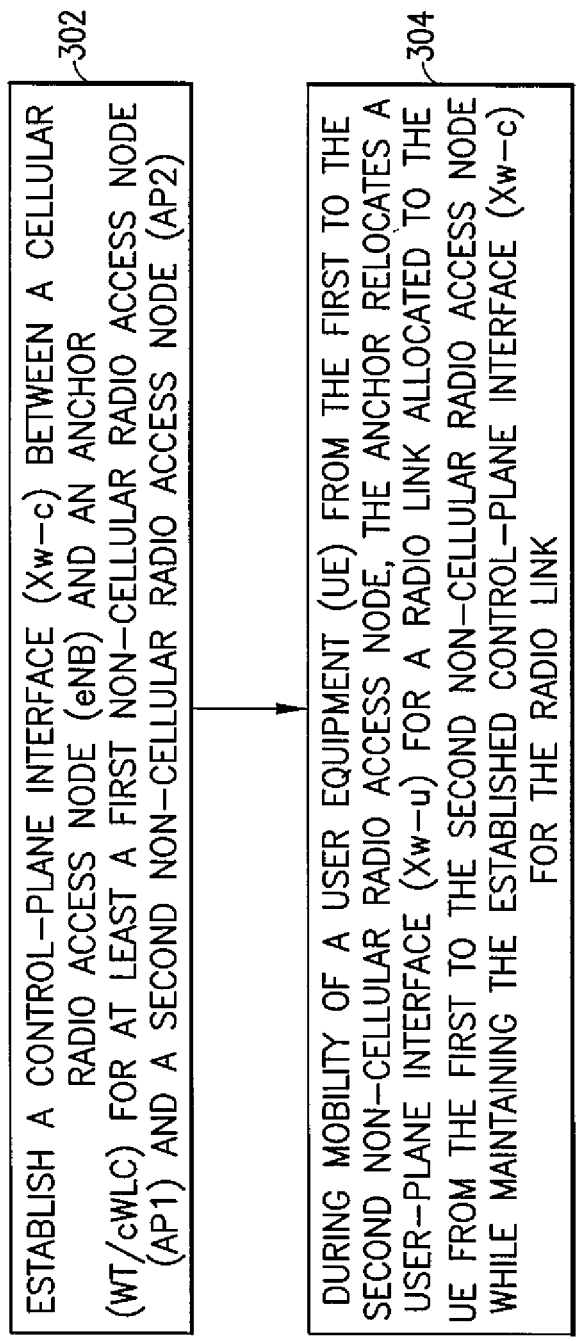
FIG. 3 is a process flow diagram summarizing certain of the above teachings from the perspective of the WT/cWLC shown at FIGS. 1-2.

FIG. 3 is a process flow diagram that summarizes some of the above aspects from the perspective of the cloud-based WT/cWLC. At block 302 an anchor (such as the WT/cWLC in the above examples) establishes a control-plane interface between a cellular radio access node and itself for at least a first non-cellular radio access node (such as AP1 in the above examples) and a second non-cellular radio access node (such as AP2 in the above examples). Since the Xw interface is split as Xw-C and Xw-U, the anchor can be considered as the WT-C. Thereafter at block 304, during mobility of a user equipment (UE) from the first to the second non-cellular radio access node, the anchor relocates a user-plane interface (such as the Xw-u interface in the above examples) for a radio link allocated to the UE from the first to the second non-cellular radio access node while maintaining the established control-plane interface (such as the Xw-c interface in the above examples) for the radio link.

Relating steps 302 and 304 more directly to the example above, a) the control-plane interface is an Xw-C interface associated with a WT-C termination; b) the user-plane interface is an Xw-U interface associated with a WT-U termination; c) the cellular radio access node is an eNodeB; the first and the second non-cellular radio access nodes are wireless local area network (WLAN) access points (APs) belonging to the anchor, having basic service sets (BSSs) that belong to a same mobility set that is configured for the UE by the eNodeB; and d) the anchor is a control plane part of a WLAN Termination (WT-C) and the APs form a user plane part of the WLAN Termination (WT-U).

In an example embodiment the radio link is a LWA WLAN radio channel allocated to the UE for carrying downlink LTE user data towards the UE; and/or uplink LTE user data is carried from the UE towards the cellular radio access node. LTE user data may be carried also to the UE over the LTE radio, and the decision whether to use WLAN or LTE radio for DL traffic is up to the PDCP scheduler in the eNB.

Further in the above example, the PDCP scheduler, disposed within the eNodeB/eNB, schedules the downlink LTE user data for delivery to the UE via the first non-cellular radio access node prior to the mobility and via the second non-cellular radio access node after the mobility. The PDCP scheduler can also schedule downlink user data on the cellular link between the UE and the eNB. As shown particularly at FIG. 2, the mobility may be autonomous in the UE but in any case mobility is detected by the WT-C when the UE performs a handover procedure with the second non-cellular radio access node.

Per FIG. 2 it is the anchor (for example the WT-C/cWLC) that informs the cellular radio access node to re-locate the user-plane interface (one or more WT-U terminations/addresses) with the UE from the first non-cellular radio access node to the second non-cellular radio access node as part of the relocating at block 304 of FIG. 3. During this relocating at step 304 of FIG. 3, the anchor (WT-C/cWLC) indicates or otherwise provides to the cellular access node/eNB the relocated bearers/links (some indication by which the cellular radio access node can identify the WT-U termination(s) with the first non-cellular radio access node, such as the UE's MAC address or TEIDs) and the tunnel endpoints used by the second AP for receiving tunneled downlink data between the cellular radio access node/eNB and the second non-cellular radio access node/AP2 for the relocated radio link/links, if changed. This may include both the DL-TEID(s) and the IP addressing information of the second non-cellular radio access node/AP2. The anchor (WT-C/cWLC) further provides to the second non-cellular radio access node/AP2 the uplink tunnel endpoints used in the cellular radio access node for uplink traffic, as part of re-locating the uplink tunnel endpoints in the cellular node (these are not changed during WT-U relocation) of the relocated LWA bearers.

Several of the above aspects of these teachings may be practiced individually or in any of various combinations. While the above description and FIG. 3 are from the particular perspective of the WT-C/cWLC that has the C-plane link with the UE, the skilled artisan will recognize that the above description and particularly FIG. 2 supports corresponding behavior on the part of the other entities eNB, AP1 and AP2.

Figure 4:
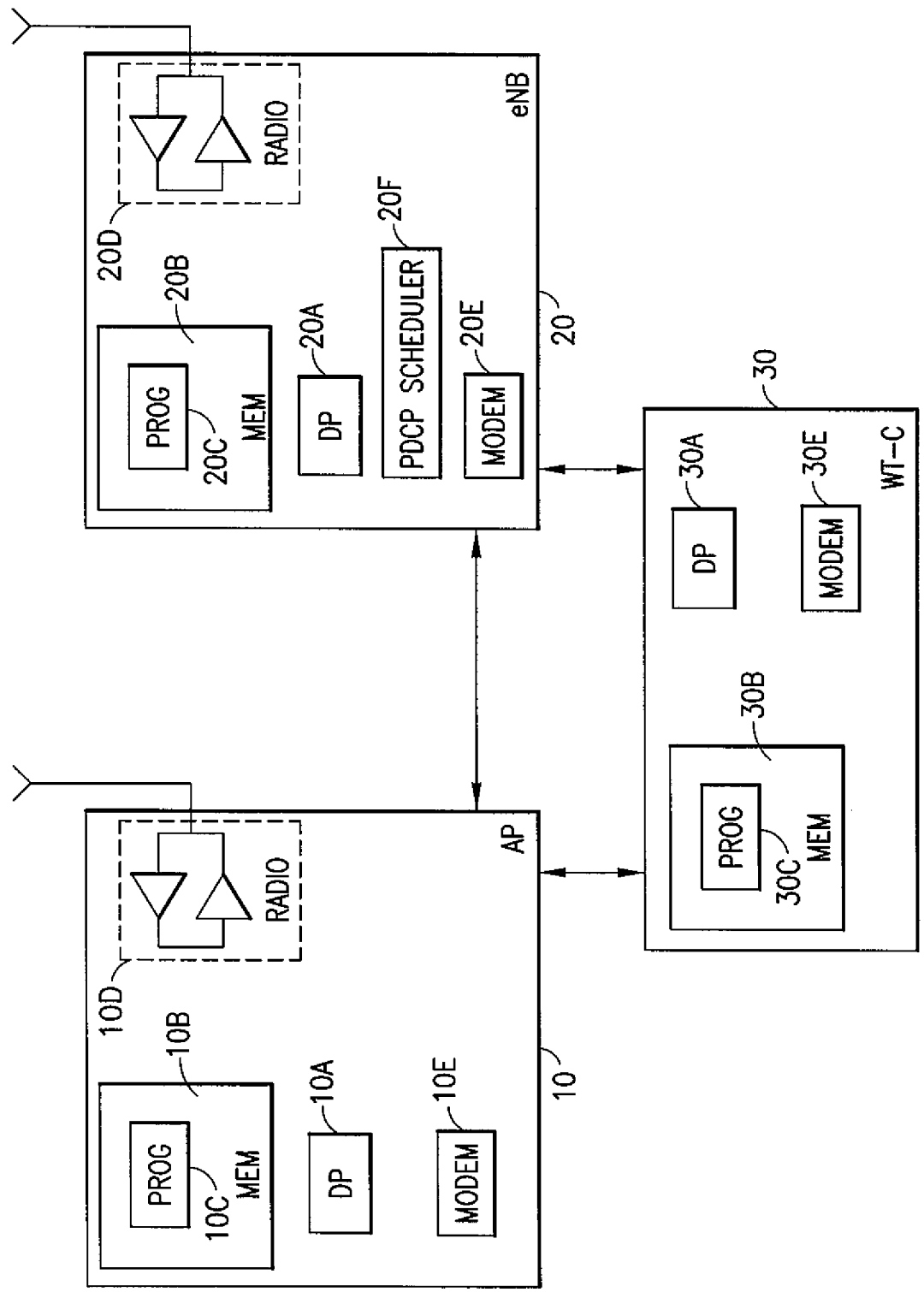
FIG. 4 is a high level schematic block diagram illustrating certain apparatus/devices that are suitable for practicing certain aspects of these teachings.

FIG. 4 is a schematic diagram illustrating some components of the various network entities shown at FIGS. 1 and 2; while the UE is not particularly shown it is functionally similar to the AP 10. The interfaces between these entities are detailed with respect to FIG. 1.

In the wireless system a wireless network is adapted for communication over a cellular wireless link and over a non-cellular wireless link with a mobile communication device which is referred to herein as a UE. The cellular link is via the eNB 20 and the non-cellular link is via the AP 10. There may be a cellular network control element (NCE, not shown) that may include mobility management entity/serving gateway (MME/S-GW) functionality, and which provides connectivity with a further network such as a telephone network and/or a data communications network (e.g., the internet).

The AP 10 includes a controller, such as a computer or a data processor (DP) 10D, a computer-readable memory medium embodied as a memory (MEM) 10B that stores a program of computer instructions (PROG) 10C, and a suitable wireless interface, such as radio frequency (RF) transmitter/receiver combination 10D for bidirectional wireless communications with the UE via one or more antennas. There is also a modem 10E for communication (wired or wireless) with the eNB 20 and with the WT/cWLC 30 as detailed above.

The eNB 20 also includes a controller, such as a computer or a data processor (DP) 20A, a computer-readable memory medium embodied as a memory (MEM) 20B that stores a program of computer instructions (PROG) 20C, and a suitable wireless interface, such as RF transmitter/receiver combination 20D for communication with the UE via one or more antennas. The eNB 20 also includes a modem 20E for communication (wired or wireless) with the AP 10 and with the WT/cWLC 30 as detailed above. Further, there is a PDCP scheduler in the eNB 20 that schedules whether downlink data is to be wirelessly provided to the UE over the cellular/LTE link or over the non-cellular/WLAN link.

The WT-C/cWLC 30 that maintains the c-plane control over the UE across the u-plane relocation includes its own controller such as a computer or a data processor (DP) 30A, a computer-readable memory medium embodied as a memory (MEM) 30B that stores a program of computer instructions (PROG) 30C, and modem 30E for communication (wired or wireless) with the AP 10 and with the eNB 20 over the interfaces detailed above.

At least one of the PROGs 10C/20C/30C is assumed to include program instructions that, when executed by the associated DP 10A/20A/30A, enable the device to operate in accordance with exemplary embodiments of this invention as detailed above. That is, various exemplary embodiments of this invention may be implemented at least in part by computer software executable by the DP 10A of the AP10; by the DP 20A of the eNB 20, by the DP 30A of the WT-C/cWLC 30, or by hardware or by a combination of software and hardware (and firmware).

In various exemplary embodiments the UE, the AP 10 and/or the eNB 20 may also include dedicated processors, for example a radio resource control RRC module, a radio-frequency RF front end (chip or otherwise), and the like. There may also be one or more modules that is/are constructed so as to operate in accordance with various exemplary embodiments of these teachings.

The computer readable MEMs 10B/20B/30B may be of any type suitable to the local technical environment and may be implemented using any one or more suitable data storage technology, such as semiconductor based memory devices, flash memory, magnetic memory devices and systems, optical memory devices and systems, fixed memory and removable memory, electromagnetic, infrared, or semiconductor systems. Following is a non-exhaustive list of more specific examples of the computer readable storage medium/memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The DPs 10A/20A/30A may be of any type suitable to the local technical environment, and may include one or more of general purpose computers, special purpose computers, microprocessors, digital signal processors (DSPs) and processors based on a multicore processor architecture, as non-limiting examples. The wireless and other interfaces (e.g., the radios 10D/20D) may be of any type suitable to the local technical environment and may be implemented using any suitable communication technology such as individual transmitters, receivers, transceivers, modems or a combination of such components.

In general, the various embodiments of the UE can include, but are not limited to, smart phones, machine-to-machine (M2M) communication devices, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Any of these may be embodied as a hand-portable device, a wearable device, a device that is implanted in whole or in part, a vehicle-mounted communication device, and the like.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into an embodiment that is not specifically detailed herein as separate from the others. Accordingly, the description is intended to embrace all such alternatives, modifications and variances which fall within the scope of the appended claims.

The following abbreviations that may be found in the specification and/or the drawing figures are defined as follows:
   3GPP Third Generation Partnership Project
   AP Access Point
   BSS Basic Service Set
   cWLC Cloud Wireless LAN Controller
   DRB data radio bearer
   eNB Evolved NodeB (base station in LTE)
   E-UTRAN evolved UMTS radio access network
   GPRS general packet radio service
   GTP GPRS Tunneling Protocol
   L2 Layer 2
   LAN Local Area Network
   LTE long term evolution (of E-UTRAN)
   LWA LTE-WLAN Link Aggregation
   MAC media access protocol
   PDCP Packet Data Convergence Protocol
   RAN radio access network RRC Radio Resource Control
SSID Service Set Identifier
TED Tunnel Endpoint Identifier
UE User Equipment
UMTS universal mobile telecommunications service
WLAN Wireless LAN
WLC Wireless LAN Controller
WT WLAN termination
Xw Xw interface between eNB and WT

What is claimed is:

1. A method comprising:
establishing a control-plane interface between a cellular radio access node and an anchor for at least a first non-cellular radio access node and a second non-cellular radio access node; and thereafter
during mobility of a user equipment from the first to the second non-cellular radio access node, the anchor relocating, at least via communicating with the cellular radio access node, a user-plane interface for a radio link allocated to the UE from the first to the second non-cellular radio access node while maintaining the established control-plane interface for the radio link, wherein re-locating the user-plane interface comprises the anchor providing, via the communicating to the cellular radio access node, indication of the re-located radio link by which the cellular radio access node can identify a termination with the first non-cellular radio access node for a user plane part of a wireless local area network and indication of a relocated termination with the second non-cellular radio access node for the user plane part of the wireless local area network, and wherein re-locating the user-plane interface further comprises the anchor providing to the second non-cellular radio access node used uplink tunnel terminations in the cellular radio access node for uplink traffic.

2. The method according to claim 1, wherein:
the control-plane interface is an Xw-C interface;
the user-plane interface is an Xw-U interface;
the cellular radio access node is a base station;
the first and the second non-cellular radio access nodes are wireless local area network access points belonging to the anchor, having basic service sets that belong to a same mobility set that is configured for the user equipment by the base station; and
the anchor is a control plane part of a wireless local area network termination and the access points form a user plane part of the wireless local area network termination.

3. The method according to claim 1, wherein:
the radio link is a long-term evolution-wireless local area network link aggregation wireless local area network radio channel allocated to the user equipment for carrying downlink cellular user data towards the user equipment.

4. The method according to claim 1, wherein downlink cellular user data to the user equipment is scheduled on the radio link by a packet data control protocol scheduler disposed within the cellular radio access node which schedules the downlink cellular user data for delivery to the user equipment:
via the first non-cellular radio access node prior to the mobility of the user equipment, and
via the second non-cellular radio access node after the mobility of the user equipment.

5. The method according to claim 1, wherein the mobility is detected by the anchor when the user equipment performs an association procedure with the second non-cellular radio access node and establishes a secure connection with it.

6. The method according to claim 5, wherein relocating the user-plane interface comprises the anchor, after detecting the user equipment mobility, informing via the communicating the cellular radio access node to re-locate the user plane part of the wireless local area network termination for the user equipment from the first non-cellular radio access node to the second non-cellular radio access node.

7. The method according to claim 1, wherein uplink cellular user data is carried from the user equipment towards the cellular radio access node.

8. The method according to claim 3, wherein uplink cellular user data is carried from the user equipment towards the cellular radio access node.

9. An apparatus comprising:
at least one memory storing a computer readable program; and
at least one processor,
wherein the at least one processor, with the at least one memory and the computer readable program, cause the apparatus to at least:
establish a control-plane interface between a cellular radio access node and an anchor for at least a first non-cellular radio access node and a second non-cellular radio access node; and thereafter
during mobility of a user equipment from the first to the second non-cellular radio access node, relocate by the anchor, at least via communicating with the cellular radio access node, a user-plane interface for a radio link allocated to the user equipment from the first to the second non-cellular radio access node while maintaining the established control-plane interface for the radio link, wherein relocating the user-plane interface comprises the anchor providing, via the communicating to the cellular radio access node, indication of the re-located radio link by which the cellular radio access node can identify a termination with the first non-cellular radio access node for a user plane part of a wireless local area network and indication of a relocated termination with the second non-cellular radio access node for the user plane part of the wireless local area network, and wherein re-locating the user-plane interface further comprises the anchor providing to the second non-cellular radio access node used uplink tunnel terminations in the cellular radio access node for uplink traffic.

10. The apparatus according to claim 9, wherein:
the control-plane interface is an Xw-C interface;
the user-plane interface is an Xw-U interface;
the cellular radio access node is a base station;
the first and the second non-cellular radio access nodes are wireless local area network access points belonging to the anchor, having basic service sets that belong to a same mobility set that is configured for the user equipment by the base station; and
the anchor is a control plane part of a wireless local area network termination and the access points form a user plane part of the wireless local area network termination.

11. The apparatus according to claim 9, wherein:
the radio link is a long-term evolution-wireless local area network link aggregation wireless local area network radio channel allocated to the user equipment for carrying downlink cellular user data towards the user equipment.

12. The apparatus according to claim 9, wherein downlink cellular user data to the user equipment is scheduled on the radio link by a packet data control protocol scheduler disposed within the cellular radio access node which schedules the downlink cellular user data for delivery to the user equipment:
   via the first non-cellular radio access node prior to the mobility of the user equipment, and
   via the second non-cellular radio access node after the mobility of the user equipment.

13. The apparatus according to claim 9, wherein the apparatus is the anchor, and the mobility is detected by the anchor when the user equipment performs an association procedure with the second non-cellular radio access node and establishes a secure connection with it.

14. The apparatus according to claim 13, wherein relocating the user-plane interface comprises the anchor, after detecting the user equipment mobility, informing via the communicating the cellular radio access node to re-locate the user plane part of the wireless local area network termination for the user equipment from the first non-cellular radio access node to the second non-cellular radio access node.

15. The apparatus according to claim 9, wherein uplink cellular user data is carried from the user equipment towards the cellular radio access node.

16. The apparatus according to claim 11, wherein uplink cellular user data is carried from the user equipment towards the cellular radio access node.

17. A non-transitory computer readable medium comprising program instructions for causing a host communication device to perform at least the following:
   establish a control-plane interface between a cellular radio access node and an anchor for at least a first non-cellular radio access node and a second non-cellular radio access node; and thereafter
   during mobility of a user equipment from the first to the second non-cellular radio access node, relocate by the anchor, at least via communicating with the cellular radio access node, a user-plane interface for a radio link allocated to the user equipment from the first to the second non-cellular radio access node while maintaining the established control-plane interface for the radio link, wherein relocating the user-plane interface comprises the anchor providing, via the communicating to the cellular radio access node, indication of the relocated radio link by which the cellular radio access node can identify a termination with the first non-cellular radio access node for a user plane part of a wireless local area network and indication of a relocated termination with the second non-cellular radio access node for the user plane part of the wireless local area network, and wherein re-locating the user-plane interface further comprises the anchor providing to the second non-cellular radio access node used uplink tunnel terminations in the cellular radio access node for uplink traffic.

18. The non-transitory computer readable medium according to claim 17, wherein:
   the control-plane interface is an Xw-C interface;
   the user-plane interface is an Xw-U interface;
   the cellular radio access node is an eNodeB;
   the first and the second non-cellular radio access nodes are wireless local area network access points belonging to the anchor, having basic service sets (BSSs) that belong to a same mobility set that is configured for the user equipment by the base station; and
   the anchor is a control plane part of a wireless local area network termination and the access points form a user plane part of the wireless local area network termination.

19. The non-transitory computer readable medium according to claim 17, wherein:
   the radio link is a long-term evolution-wireless local area network link aggregation wireless local area network radio channel allocated to the user equipment for carrying downlink cellular user data towards the user equipment; and/or
   uplink cellular user data is carried from the user equipment towards the cellular radio access node.

20. The non-transitory computer readable medium according to claim 17, wherein downlink cellular user data to the user equipment is scheduled on the radio link by a packet data control protocol scheduler disposed within the cellular radio access node which schedules the downlink cellular user data for delivery to the user equipment:
   via the first non-cellular radio access node prior to the mobility of the user equipment, and
   via the second non-cellular radio access node after the mobility of the user equipment.

* * * * *